US012608679B2

(12) United States Patent
Knight et al.

(10) Patent No.:     US 12,608,679 B2
(45) Date of Patent:     Apr. 21, 2026

(54) INFERRING A LOCATION OF AN ITEM WITHIN A WAREHOUSE FROM A TAXONOMY OF ITEMS OFFERED BY THE WAREHOUSE AND LOCATIONS OF OTHER ITEMS WITHIN THE WAREHOUSE

(71) Applicant: Maplebear Inc., San Francisco, CA (US)

(72) Inventors: Benjamin Knight, Oakland, CA (US); Darren Johnson, Elko, NV (US); Daniel Haugh, San Francisco, CA (US); Saumitra Maheshwari, Sunnyvale, CA (US); Qi Xi, New York, NY (US); Conor Woods, Berkeley, CA (US)

(73) Assignee: Maplebear Inc., San Francisco, CA (US)

( * ) Notice: Subject to any disclaimer, the term of this patent is extended or adjusted under 35 U.S.C. 154(b) by 74 days.

(21) Appl. No.: 18/916,477

(22) Filed: Oct. 15, 2024

(65) Prior Publication Data

US 2025/0037076 A1     Jan. 30, 2025

Related U.S. Application Data

(63) Continuation of application No. 17/534,281, filed on Nov. 23, 2021, now Pat. No. 12,147,938.

(51) Int. Cl.
G06Q 10/087     (2023.01)
G06Q 30/0601     (2023.01)

(52) U.S. Cl.
CPC ....... G06Q 10/087 (2013.01); G06Q 30/0629 (2013.01); G06Q 30/0641 (2013.01)

(58) Field of Classification Search
CPC ............ G06Q 10/087; G06Q 30/0629; G06Q 30/0641; G06Q 30/0601; G06Q 30/0603;
(Continued)

(56) References Cited

U.S. PATENT DOCUMENTS

| 8,024,064 B1 * | 9/2011 | Sanghavi | ............. G06Q 10/087 |
| | | | 705/28 |
| 2015/0120514 A1 * | 4/2015 | Deshpande | .......... G06Q 30/016 |
| | | | 705/28 |

(Continued)

OTHER PUBLICATIONS

United States Patent Office, Office Action, U.S. Appl. No. 17/534,281, Oct. 5, 2023, 28 pages.

*Primary Examiner* — Garcia Ade
(74) *Attorney, Agent, or Firm* — Fenwick & West LLP

(57)     ABSTRACT

A method for optimizing order fulfillment in a warehouse by an online system. The system receives an item catalog from an inventory system, which includes item locations. The system also obtains a taxonomy that organizes items into hierarchical levels based on attributes. When an order is placed by a user, the system checks whether the item catalog contains location data for each item. If an item's location is missing, the system identifies alternative items from the taxonomy with shared attributes and uses the location of a selected alternative item as a proxy. The system determines a picking sequence for the items in the order, optimized to minimize travel distance within the warehouse, and transmits the sequence to a shopper's device for fulfillment.

20 Claims, 5 Drawing Sheets

100

Warehouse 110a     Warehouse 110b     Warehouse 110c

Shopper
108

Shopper Mobile Application
112

Online Concierge System
102

Customer Mobile Application
106

Customer
104

(58) Field of Classification Search
CPC ........... G06Q 30/0633; G06Q 30/0635; G06Q
30/0639
See application file for complete search history.

(56) References Cited

U.S. PATENT DOCUMENTS

| 2015/0169597 | A1* | 6/2015 | Edge | ....................... | G06Q 30/06 |
| | | | | | 707/751 |
| 2017/0116663 | A1* | 4/2017 | Francis | .............. | G06Q 30/0639 |
| 2020/0357040 | A1* | 11/2020 | Patel | ................. | G06Q 30/0639 |
| 2023/0005046 | A1* | 1/2023 | McDaniel | ............. | H04W 4/024 |

* cited by examiner

100

500

INFERRING A LOCATION OF AN ITEM WITHIN A WAREHOUSE FROM A TAXONOMY OF ITEMS OFFERED BY THE WAREHOUSE AND LOCATIONS OF OTHER ITEMS WITHIN THE WAREHOUSE

CROSS REFERENCE TO RELATED APPLICATIONS

This application is a continuation of co-pending U.S. application Ser. No. 17/534,281, filed Nov. 23, 2021, which is incorporated by reference in its entirety.

BACKGROUND

This disclosure relates generally to fulfilling orders received by an online concierge system, and more specifically to leveraging locations of other items within a warehouse to infer a location of an item in the warehouse for routing a shopper fulfilling an order through the warehouse.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

To expedite fulfillment of orders by shoppers through an online concierge system, a warehouse provides the online concierge system with an item catalog including attributes of items offered by the warehouse. The item catalog identifies locations within the warehouse of various items. For example, the item catalog includes an aisle name or number or a department name in association with an item, allowing the item catalog to identify a location within the warehouse of the item. Additionally, a warehouse may provide the online concierge system with a layout of the warehouse that identifies locations of aisles or departments within the warehouse. For example, the warehouse provides the online concierge system with a map identifying locations of different aisles or of different locations within the warehouse.

For an order, a conventional online concierge system leverages the item catalog to identify locations within a warehouse of each item included in the order. From the identified locations and the layout of the warehouse, the online concierge system sorts the items into a sequence based on the locations within the warehouse of different items. When sorting the items, the online concierge system determines positions of items in the sequence to minimize a distance travelled by a shopper in the warehouse to obtain items, which reduces the amount of time spent by the shopper in the warehouse to fulfill the order.

However, many warehouses fail to provide locations within a warehouse for certain items. For example, an item catalog received from a warehouse lacks location information for a certain percentage of items in the item catalog. When an order received by a conventional online concierge system includes an item for which the conventional online concierge system does not have a location within the warehouse, the conventional online concierge system is unable to optimize ordering of the items for selection by a shopper. This increases the distance the shopper travels within the warehouse, often having a shopper backtrack through the warehouse or search through the warehouse, increasing the amount of time for the order to be fulfilled. Such an increase in order fulfillment time may subsequently decrease the number of orders the user places through the online concierge system or decrease the frequency with which the user places orders through the online concierge system.

SUMMARY

An online concierge system obtains an item catalog from a warehouse. The item catalog identifies items offered by the warehouse and includes attributes for each item. The item catalog identifies different items offered by the warehouse and includes attributes of each item. An attribute of an item is a location of the item within the warehouse. For example, an entry for an item in the item catalog includes a field for the location within the warehouse of the item, with a value of the field specifying an aisle within the warehouse or a department within the warehouse for an item. The item catalog may include any suitable attributes for the item, allowing the item catalog to maintain any suitable information about items offered by the warehouse. The online concierge system stores the item catalog in association with an identifier of the warehouse.

The online concierge system obtains a taxonomy of items offered by the warehouse from the item catalog received from the warehouse, with different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse matching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse in various embodiments. In other embodiments, the online concierge system maintains the taxonomy and applies a trained classification model to an item catalog received from a warehouse to include different items in levels of the taxonomy, so application of the trained classification model associates specific items with generic item descriptions corresponding to levels within the taxonomy.

When the online concierge system receives an order from a user for fulfillment at the warehouse, the order includes one or more items offered by the warehouse. The online concierge system sorts the items in the order into a sequence based on locations of the items in the order within the warehouse and a layout of the warehouse. For example, the sequence of items includes items in a common location of the warehouse, in locations within the warehouse that are within a threshold distance of each other, or in locations of the warehouse that are adjacent to each other in adjacent positions of the sequence. This sequencing of items in the order allows the online concierge system to identify items of order to a shopper so a distance traveled within the warehouse by the shopper is minimized. Such a reduction in distance traveled within the warehouse reduces an amount of time for the shopper to fulfill the order.

When the online concierge system receives an order including a particular item for which the online concierge system does not have a location within the warehouse of the particular item, a likelihood of the online concierge system sorting the items of the order into a sequence that minimizes a shopper's distance traveled within the warehouse is decreased. To compensate for the lack of a location within the warehouse of the particular item, the online concierge system leverages the obtained taxonomy. The online concierge system identifies the particular item in the taxonomy and determines a higher level in the taxonomy that includes the particular item. Different levels of the taxonomy provide different levels of specificity about items included in the levels. For example, a lowest level in the taxonomy identifies specific items, while a next highest level in the taxonomy identifies a generic item description connected to specific items in the lowest level of the taxonomy. Similarly, another level in the taxonomy higher than the level identifying a generic item description identifies one or more categories, with a category including one or more generic item descriptions. Hence, higher levels in the taxonomy identify a wider range of items that have one or more common attributes. For example, the online concierge system determines a higher level in the taxonomy to which the particular item is connected; in the preceding examples, the online concierge system identifies a generic item description connected to the particular item via the taxonomy.

From the determined higher level in the taxonomy, the online concierge system identifies one or more alternative items that are also included in the determined higher level. For example, the online concierge system identifies alternative items that are connected to the determined higher level in the taxonomy. This allows the online concierge system to identify alternative items that each have one or more attributes in common with the particular item because of their common connection to the determined higher level. For example, the online concierge system determines a generic item description connected to the particular item in the taxonomy and identifies alternative items that are also connected to the determined generic item description in the taxonomy.

In various embodiments, the online concierge system traverses the taxonomy to higher levels in response to the online concierge system having a location within the warehouse for less than a threshold number or threshold percentage of alternative items coupled to a common generic item description in the taxonomy as the particular item. For example, the online concierge system determines a category in a higher level of the taxonomy than a determined generic item description for the particular item that is connected to the determined generic item description in the taxonomy. The online concierge system identifies additional alternative items that are connected to one or more additional generic item descriptions that are connected to the determined category, as further described above. In various embodiments, the online concierge system iteratively identifies higher levels within the taxonomy that include (e.g., are indirectly connected to) the particular item until identifying a level of the taxonomy including at least a threshold number or a threshold percentage of alternative items for which the online concierge system has locations within the warehouse.

The online concierge system selects an identified alternative item and infers a location within the warehouse of the particular item as a location within the warehouse stored for the identified alternative item. For example, the online concierge system selects an identified alternative item for which the online concierge system has a location within the warehouse that was most recently identified as being obtained by a shopper. As an example, the online concierge system retrieves previously received orders, identifies previously received orders including at least one identified alternative item, and selects an identified alternative item for which the online concierge system has a location within the warehouse that was most recently identified as obtained by a shopper. However, in various embodiments, the online concierge system selects the identified alternative item based on any suitable criteria. For example, the online concierge system selects an identified alternative item that was identified as obtained by one or more shoppers in at least a threshold percentage of orders fulfilled within a specific time interval from a current time. As the determined level of the taxonomy includes both the selected identified alternative item and the particular item, the online concierge system determines that the particular item and the alternative items have one or more common attributes, allowing the online concierge system 102 to use a location of the selected alternative item as a proxy for a location of the particular item because of the one or more common attributes.

The online concierge system subsequently sorts the items included in the received order into a sequence, with positions of items in the sequence based on locations of the items in the warehouse. The inferred location of the particular item is used by the online concierge system when sorting the items included in the order, so the inferred location of the particular item determines a position of the particular item in the sequence. The sequence accounts for locations of items included in the order within the warehouse and the layout of the warehouse so items have positions in the sequence that minimizes the distance the shopper travels within the warehouse to obtain the items in the order when obtaining items according to the sequence. For example, the online concierge system sorts the items so items in a common aisle, in aisles within a threshold distance of each other, or in adjacent aisles in the warehouse have adjacent positions in the sequence, allowing the shopper to efficiently obtain items when travelling through the warehouse. The online concierge system transmits the sequence to a client device of a shopper who selects the order for display in a shopper mobile application to identify the items included in the received order to the shopper in a sequence that minimizes a distance for the shopper to travel through the warehouse to obtain the items included in the received order.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
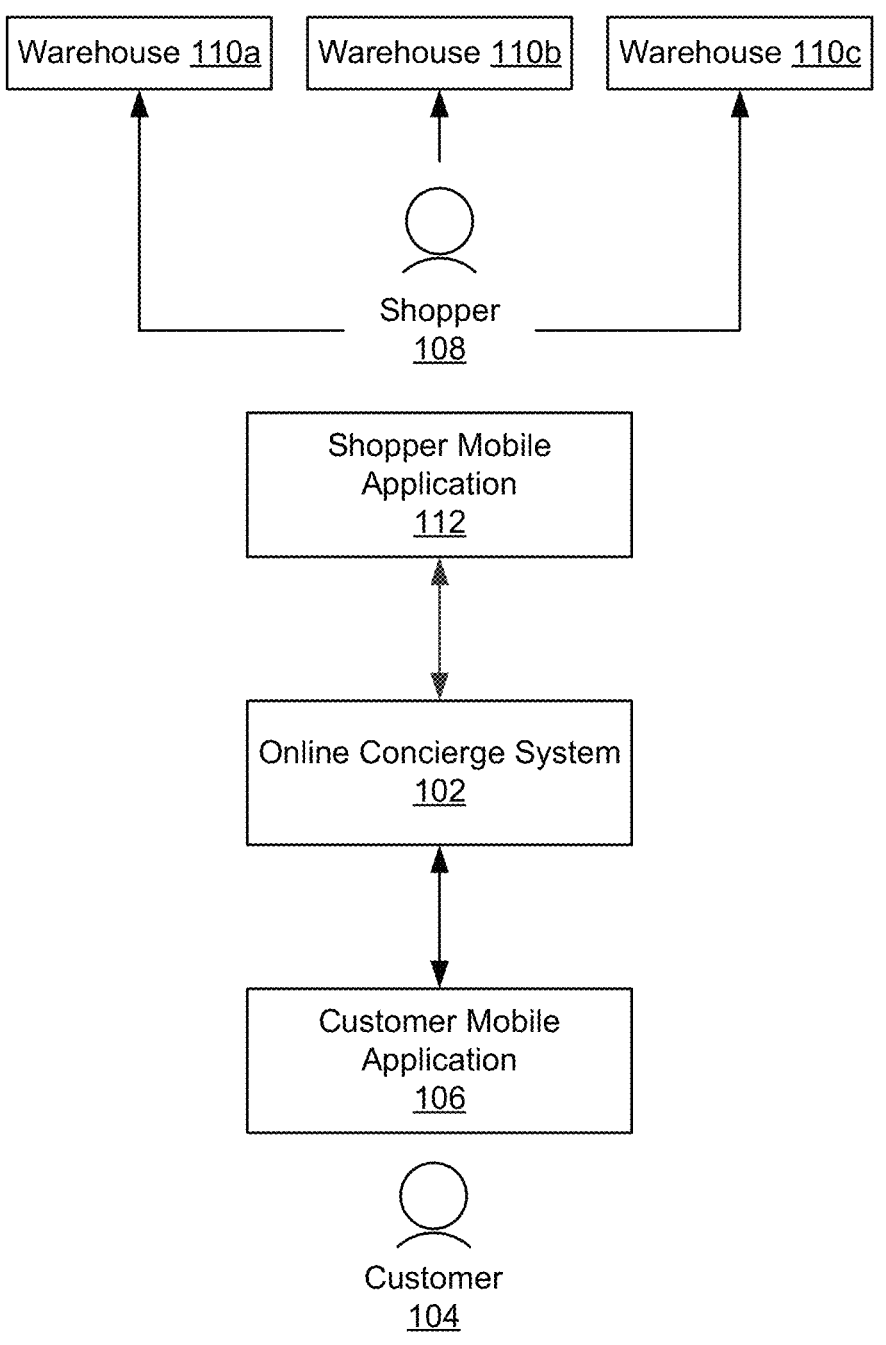
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
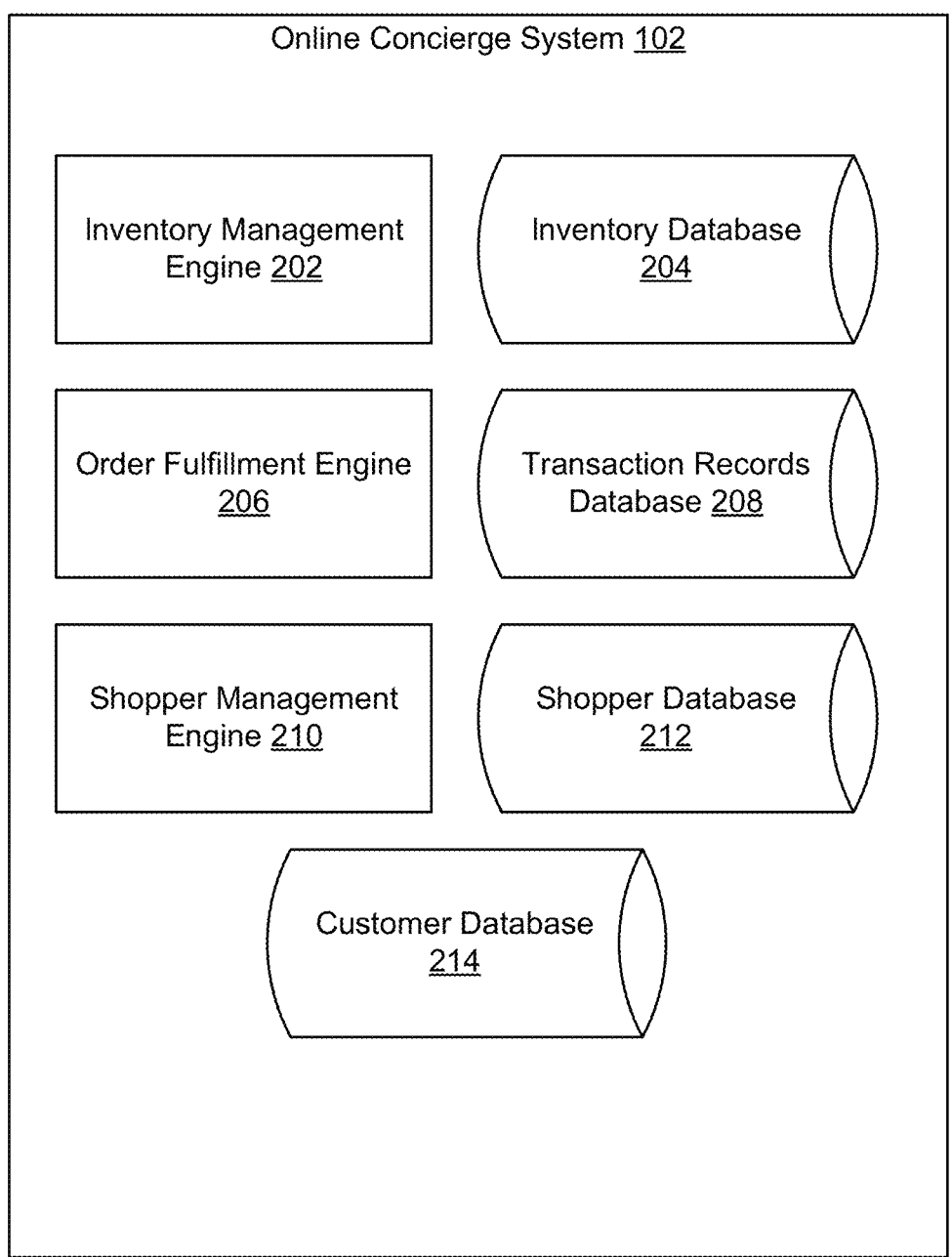
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records-one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

The inventory management engine 202 receives an item catalog from a warehouse 110 identifying items offered for purchase by the warehouse 110. The item catalog identifies different items offered by the warehouse 110 and includes attributes of each item. One attribute of an item is a location of the item within the warehouse 110. For example, the item catalog includes an aisle within the warehouse 110 or a department within the warehouse 110 for an item. Various other attributes may be included for an item in the item catalog, allowing the warehouse 110 to provide any suitable information about items offered by the warehouse to the online concierge system 102 via the item catalog. The item catalog for a warehouse 110 is stored in the inventory database 204 in association with an identifier of the warehouse 110.

In various embodiments, the inventory management engine 202 maintains a taxonomy of items offered for purchase by one or more warehouses 110. From the item catalog, the inventory management engine 202 determines a taxonomy of items offered by the warehouse 110. Different levels in the taxonomy provide different levels of specificity about items included in the levels. For example, the taxonomy includes different categories for items, with categories in different levels of the taxonomy providing different levels of specificity for categories, with lower levels in the hierarchy corresponding to more specific categories, and a lowest level of the hierarchy identifying different specific items. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 marching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with generic item descriptions corresponding to levels within the taxonomy.

In various embodiments, the inventory management engine 202 also receives a layout from the warehouse 110, with the layout identifying different locations within the warehouse 110 relative to each other. For example, the layout is a map of the warehouse 110, with different aisles or departments identified in the map, allowing the map to identify relative positions of aisles or departments to each other within the warehouse 110. The inventory management engine 202 receives an updated layout from the warehouse 110 if the warehouse 110 changes locations of items within the warehouse 110 or rearranges locations in the warehouse 110 relative to each other. In various embodiments, the layout for a warehouse 110 is stored in the inventory database 204 in association with an identifier of the warehouse 110.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

In various embodiments, the order fulfillment engine 206 sorts items included in an order and transmits the sorted items to a shopper who selects the order for fulfillment. When sorting the items, the order fulfillment engine 206 accounts for locations of items within the warehouse 110 and the layout of the warehouse 110 so the items are sorted into a sequence that minimizes the distance the shopper travels within the warehouse 110 to obtain the items in the order. For example, the order fulfillment engine 206 sorts the items so items in a common aisle or in adjacent aisles in the warehouse 110 have adjacent positions in the sequence, allowing the shopper to efficiently obtain items when travelling through the warehouse 110.

However, when an order includes a particular item for which a location within the warehouse 110 is not stored in the inventory database 204, the order fulfillment engine 206 leverages the taxonomy for the warehouse 110 and previously fulfilled orders from the warehouse 110 to determine an inferred location within the warehouse 110 for the particular item and uses the inferred location within the warehouse 110 for the particular item when storing the items in the order. As further described below in conjunction with FIG. 4, the order fulfillment engine 206 identifies the particular item in the taxonomy and identifies a higher level in the taxonomy that includes the particular item. This allows the order fulfillment engine 206 to identify a generic item description or a category including the particular item. From previously fulfilled orders from the warehouse 110, the order fulfillment engine 206 determines one or more alternative items included in the identified higher level in the taxonomy (e.g., alternative items having a common generic item description or a common category with the particular item) that were obtained by shoppers when fulfilling one or more prior orders. As further described below in conjunction with FIG. 4, the order fulfillment engine 206 determines locations within the warehouse 110 of one or more of the alternative items that were obtained by shoppers from the item catalog for the warehouse 110 and infers the location of the particular item in the warehouse 110 as a location of one of the alternative items determined by the order fulfillment engine 206.

Customer Mobile Application

Figure 3A:
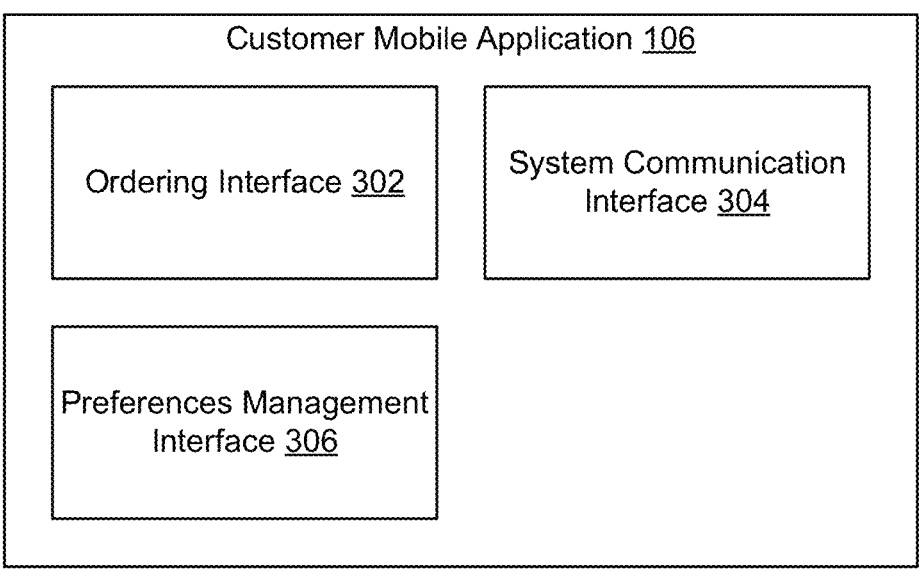
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, and so on.

Shopper Mobile Application

Figure 3B:
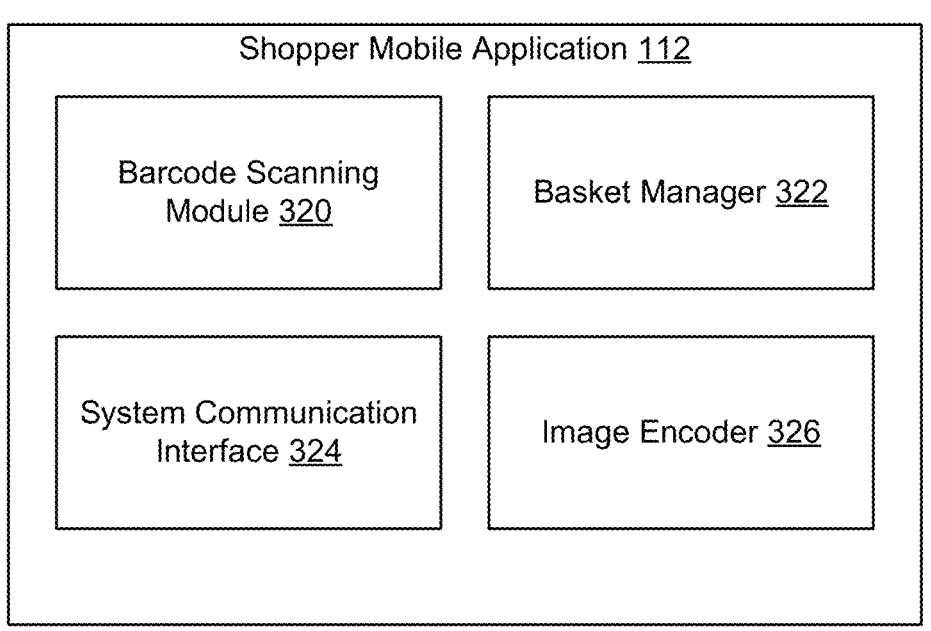
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 4:
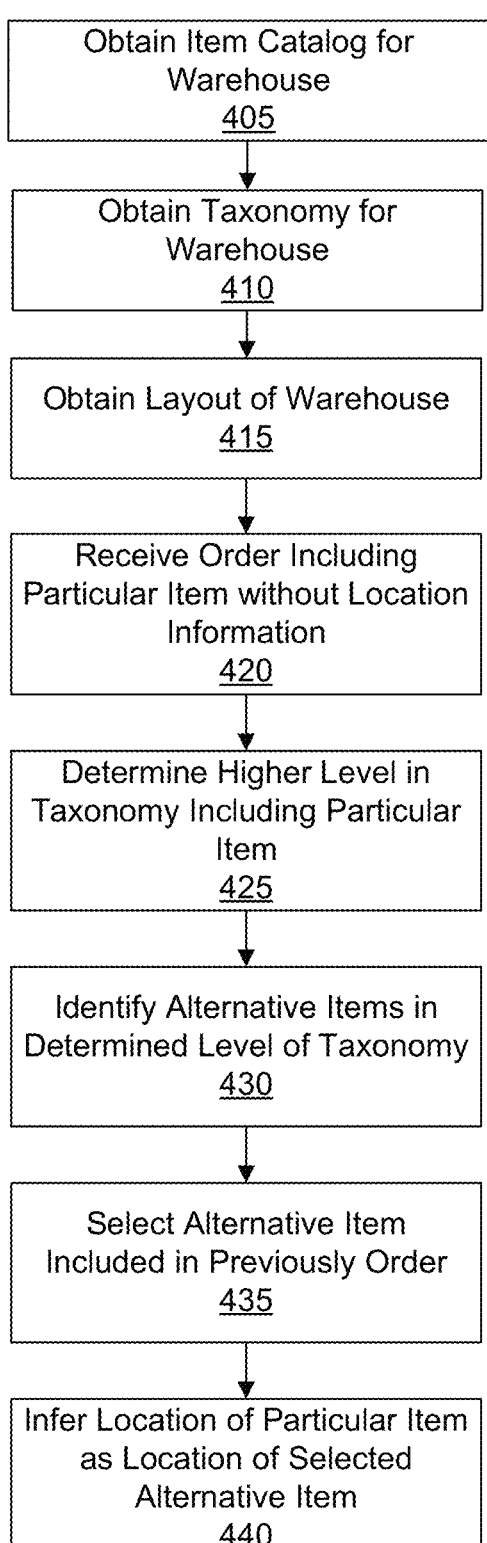
FIG. 4 is a flowchart of a method for inferring a location of a particular item within a warehouse from locations within the warehouse of other items, according to one embodiment.

Inferring a Location within a Warehouse of an Item from Locations of Other Items FIG. 4 is a flowchart of one embodiment of a method for inferring a location of a particular item within a warehouse 110 from locations within the warehouse 110 of other items. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments.

The online concierge system 102 obtains 405 an item catalog from a warehouse 110. The item catalog identifies items offered by the warehouse 110 and includes attributes for each item. The item catalog identifies different items offered by the warehouse 110 and includes attributes of each item. For example, the item catalog includes an entry for each item identifier corresponding to an item, with different fields in the entry corresponding to different attributes of the item. A value in a field corresponding to an attribute specifies a value of the attribute for the item. Example attributes of an item include a brand, a price, a weight, one or more keywords, as well as any other suitable information. Further, an attribute of an item is a location of the item within the warehouse 110. For example, an entry for an item in the item catalog includes a field for the location within the warehouse 110 of the item, with a value of the field specifying an aisle within the warehouse 110 or a department within the warehouse 110 for an item. The item catalog may include any suitable attributes for item, allowing the item catalog to maintain any suitable information about items offered by the warehouse 110. The online concierge system 102 stores the item catalog in association with an identifier of the warehouse 110.

The online concierge system 102 obtains 410 a taxonomy of items offered by the warehouse 110 from the item catalog received from the warehouse 110, with different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 matching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the online concierge system 102 maintains the taxonomy and applies a trained classification model to an item catalog received from a warehouse 110 to include different items in levels of the taxonomy, so application of the trained classification model associates specific items with generic item descriptions corresponding to levels within the taxonomy.

Additionally, the online concierge system 102 obtains 415 a layout of the warehouse 110. The layout identifies different locations within the warehouse 110 relative to each other. For example, the layout is a map of the warehouse 110, with different aisles or departments identified in the map, allowing the map to identify relative positions of aisles or departments to each other within the warehouse 110. In various embodiments, the online concierge system 102 stores the obtained layout in association with an identifier of the warehouse 110.

When the online concierge system 102 receives an order from a user for fulfillment at the warehouse 110, the order includes one or more items offered by the warehouse 110. The online concierge system 102 sorts the items in the order into a sequence based on locations of the items in the order within the warehouse 110 and the layout of the warehouse. For example, the sequence of items includes items in a common location of the warehouse 110, in locations within the warehouse 110 that are within a threshold distance of each other, or in locations of the warehouse 110 that are adjacent to each other in adjacent positions of the sequence. This sequencing of items in the order allows the online concierge system 102 to identify items of order to a shopper so a distance traveled within the warehouse 110 by the shopper is minimized. Such a reduction in distance traveled within the warehouse 110 reduces the amount of time for the shopper to fulfill the order.

When the online concierge system 102 receives 420 an order including a particular item for which the online concierge system 102 does not have a location within the warehouse 110 of the particular item, a likelihood of the online concierge system 102 sorting the items of the order into a sequence that minimizes a shopper's distance traveled within the warehouse 110 is decreased. To compensate for the lack of a location within the warehouse 110 of the particular item, the online concierge system 102 leverages the obtained taxonomy. The online concierge system 102 identifies the particular item in the taxonomy and determines 425 a higher level in the taxonomy that includes the particular item. As further described above in conjunction with FIG. 2, different levels of the taxonomy provide different levels of specificity about items included in the levels. For example, a lowest level in the taxonomy identifies specific items, while a next highest level in the taxonomy identifies a generic item description connected to specific items in the lowest level of the taxonomy. Similarly, another level in the taxonomy higher than the level identifying a generic item description identifies one or more categories, with a category including one or more generic item descriptions. Hence, higher levels in the taxonomy identify a wider range of items that have one or more common attributes. For example, the online concierge system 102 determines 425 a higher level in the taxonomy to which the particular item is connected; in the preceding examples, the online concierge system 102 identifies a generic item description connected to the particular item via the taxonomy.

From the determined higher level in the taxonomy, the online concierge system 102 identifies 430 one or more alternative items that are also included in the determined higher level. For example, the online concierge system 102 identifies alternative items 430 that are connected to the determined higher level in the taxonomy. This allows the online concierge system 102 to identify 430 alternative items that each have one or more attributes in common with the particular item because of their common connection to the determined higher level. For example, the online concierge system 102 determines 425 a generic item description connected to the particular item in the taxonomy and identifies 430 alternative items that are also connected to the determined generic item description in the taxonomy.

In various embodiments, the online concierge system 102 traverses the taxonomy to higher levels in response to the online concierge system 102 having a location within the warehouse 110 for less than a threshold number or threshold percentage of alternative items coupled to a common generic item description in the taxonomy as the particular item. For example, the online concierge system 102 determines a category in a higher level of the taxonomy than a determined generic item description for the particular item that is connected to the determined generic item description in the taxonomy. The online concierge system 102 identifies additional alternative items that are connected to one or more additional generic item descriptions that are connected to the determined category, as further described above. In various embodiments, the online concierge system 102 iteratively identifies higher levels within the taxonomy that include (e.g., are indirectly connected to) the particular item until identifying a level of the taxonomy including at least a threshold number or a threshold percentage of alternative items for which the online concierge system 102 has locations within the warehouse 110.

The online concierge system 102 selects 435 an identified alternative item and infers 440 a location within the warehouse of the particular item as a location within the warehouse 110 stored for the identified alternative item. For example, the online concierge system 102 selects an identified alternative item for which the online concierge system 102 has a location within the warehouse 110 that was most recently identified as being obtained by a shopper. As an example, the online concierge system 102 retrieves previously received orders, identifies previously received orders including at least one identified alternative item, and selects 435 an identified alternative item for which the online concierge system 102 has a location within the warehouse 110 that was most recently identified as obtained by a shopper. However, in various embodiments, the online concierge system 102 selects 435 the identified alternative item based on any suitable criteria. For example, the online concierge system 102 selects 435 an identified alternative item that was identified as obtained by one or more shoppers in at least a threshold percentage of orders fulfilled within a specific time interval from a current time. As the determined level of the taxonomy includes both the selected identified alternative item and the particular item, the online concierge system 102 determines that the particular item and the alternative items have one or more common attributes, allowing the online concierge system 102 to use a location of the selected alternative item as a proxy for a location of the particular item because of the one or more common attributes.

The online concierge system 102 subsequently sorts the items included in the received order into a sequence, with positions of items in the sequence based on locations of the items in the warehouse 110. The inferred location of the particular item is used by the online concierge system 102 when sorting the items included in the order, so the inferred location of the particular item determines a position of the particular item in the sequence. The sequence accounts for locations of items included in the order within the warehouse 110 and the layout of the warehouse 110 so items have positions in the sequence that minimizes the distance the shopper travels within the warehouse 110 to obtain the items in the order when obtaining items according to the sequence. For example, the online concierge system 102 sorts the items so items in a common aisle, in aisles within a threshold distance of each other, or in adjacent aisles in the warehouse 110 have adjacent positions in the sequence, allowing the shopper to efficiently obtain items when travelling through the warehouse 110. The online concierge system 102 accounts for previously fulfilled orders to sort the items in various embodiments. For example, the online concierge system 102 determines an amount of time in which various shoppers obtained items in previously received orders, and sorts items in the received order based on sequences in which shoppers who obtained the items, or items having a common generic item description as items in the received order, in previously received orders in less than a threshold amount of time. In another example, the online concierge system 102 ranks previously received orders in which the items, or items having a common generic item description as items in the received order, based on amounts of time for shoppers to obtain the items included in the previously received orders and sorts items in the received order based on sequences in which shoppers who obtained the items, or items having a common generic item description as items in the received order, in previously received orders having at least a threshold position in the ranking. The online concierge system 102 transmits the sequence to a client device of a shopper who selects the order for display in a shopper mobile application 112 to identify the items included in the received order to the shopper in a sequence that minimizes a distance for the shopper to travel through the warehouse 110 to obtain the items included in the received order.

Figure 5:
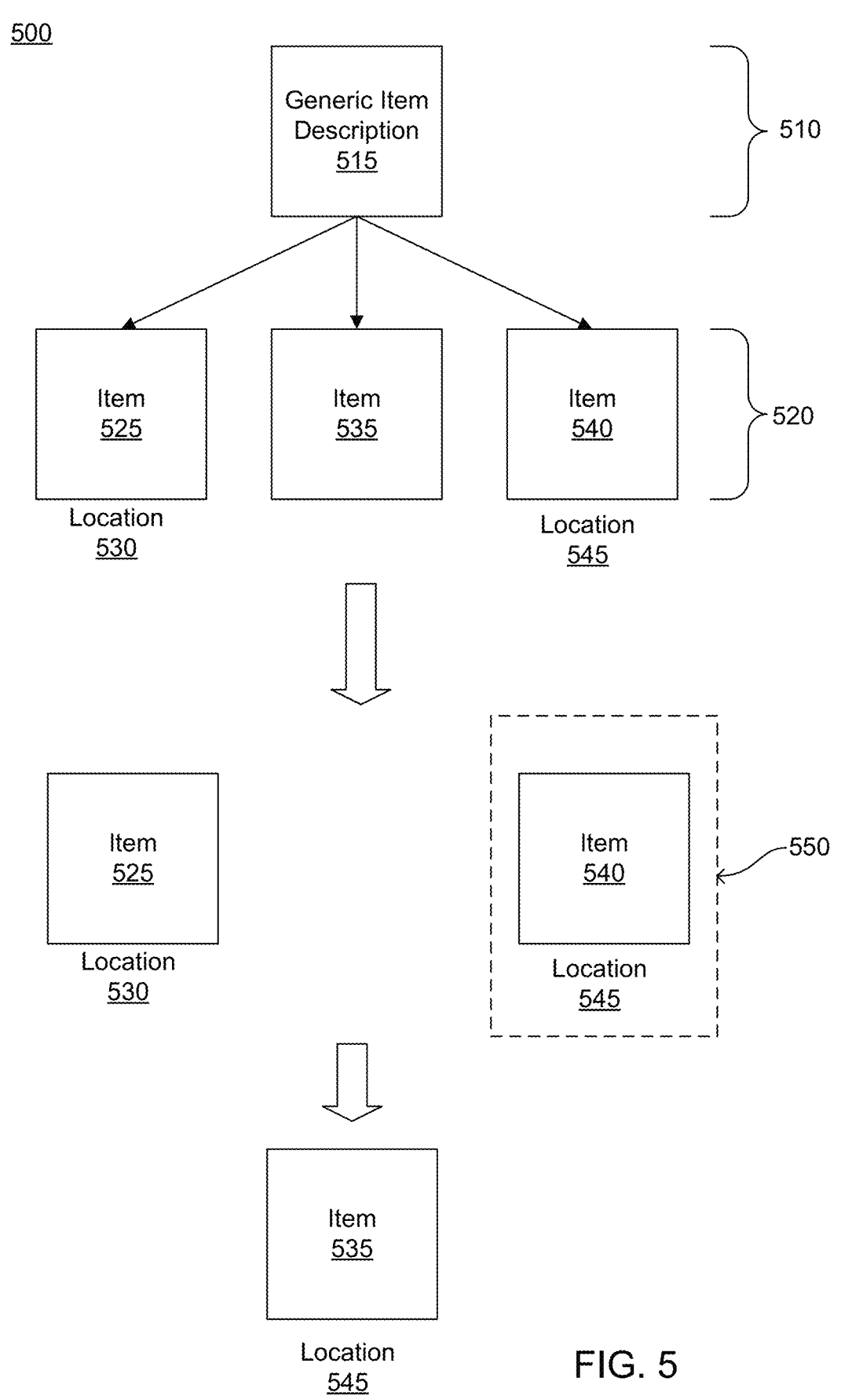
FIG. 5 is a process flow diagram of the online concierge system inferring a location for a particular item within a warehouse from locations of other items within the warehouse according to one embodiment.

FIG. 5 is a process flow diagram of the online concierge system 102 inferring a location for a particular item within a warehouse 110 from locations of other items within the warehouse 110. In the example of FIG. 5, a portion of a taxonomy 500 is shown. For purposes of illustration, FIG. 5 shows a level 510 of the taxonomy corresponding to a generic item description 515 and a lower level 515 of the taxonomy including item 525, item 535, and item 540. As shown in FIG. 5, each of item 525, item 535, and item 540 is connected to the generic item description 515 via the taxonomy 500. Hence, item 525, item 535, and item 540 have one or more common attributes corresponding to generic item description 515.

In the example of FIG. 5, the online concierge system 102 has a location 530 of item 525 within the warehouse and a location 545 of item 540 within the warehouse but does not have a location within the warehouse of item 535. For example, an item catalog received from the warehouse 100 includes location 530 for item 525 and location 545 for item 540 but does not include a location for item 535. As further described above, the lack of location information for item 535 prevents the online concierge system 102 from sorting items of an order including item 535 to minimize a distance travelled by a shopper within the warehouse 110, increasing a time for fulfilling the order.

To offset the lack of a location for item 535, when the online concierge system 102 receives an order including item 535, the online concierge system 102 determines a higher level in the taxonomy 500 that includes item 535. In the example of FIG. 5, the online concierge system 102 identifies item 535 in the taxonomy 500 and identifies a generic item description 515 in a higher level of the taxonomy 500 than item 535 that is connected to item 535 in the taxonomy 500. Hence, in the example of FIG. 5, the online concierge system 102 identifies generic item description 515 as in a higher level of the taxonomy than item 535 and coupled to item 535.

The online concierge system 102 determines alternative items that are also connected to generic item description 515 in the taxonomy 500. In the example of FIG. 5, the online concierge system 102 identifies item 525 and item 540 as alternative items, as both item 525 and item 540 are connected to generic item description 515, like item 535. Hence, the taxonomy 500 allows the online concierge system 102 to identify items 525 and 540 that have a common generic item description as item 535, indicating one or more common attributes between item 535 and items 525 and 540.

From locations within the warehouse of the alternative items, items 525 and 540, the online concierge system 102 infers a location of item 535 within the warehouse 100. In various embodiments, the online concierge system 102 selects an alternative item and infers the location of item 535 within the warehouse 110 as a location of the selected alternative item. For purposes of illustration, FIG. 5 shows an example where the online concierge system 102 selects 550 item 540, so the online concierge system 102 infers that location 545 within the warehouse 110 of item 540 is the location within the warehouse 110 of item 535. As further described above in conjunction with FIG. 4, the online concierge system 102 may use any suitable criteria for selecting an alternative item. For example, the online concierge system 102 receives information from shoppers when a shopper obtains an item for an order, with the information including a time when the item was obtained by the shopper. The online concierge system 102 selects an alternative item that was most recently obtained by a shopper and infers the location of item 535 as the location of the most recently obtained alternative item in some embodiments. Alternatively, the online concierge system 102 selects an alternative item that was obtained for at least a threshold number or a threshold percentage of orders within a specific time interval (e.g., within a threshold time of a current time). This allows the online concierge system 102 to leverage known locations for the alternative items to infer a location for the item 535, allowing the online concierge system 102 to more optimally sequence items in an order including item 535 by accounting for the inferred location of the item 535 when sequencing the items of an order based on their locations within the warehouse 110.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, micro-code, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

receiving, at an online concierge system, an item catalog from an inventory system, the item catalog identifying locations within a warehouse for a set of items offered by the warehouse;

obtaining a taxonomy at the online concierge system, the taxonomy including multiple levels, with different levels providing different levels of specificity about items offered by the warehouse included in the levels;

receiving, at the online concierge system, an order from a customer client device associated with a user for fulfillment at the warehouse, the order including one or more items;

for each of the one or more items, determining whether the item catalog includes a location of the item;

responsive to determining that the item catalog associated with the warehouse does not have a location of the item within the warehouse, identifying one or more alternative items from the taxonomy based on shared attributes between the item and the one or more alternative items;

selecting an identified alternative item for which the online concierge system has a location within the warehouse; and determining the location within the warehouse of the item as the location within the warehouse of the selected identified alternative item;

determining, by the online concierge system, a picking sequence of the one or more items in the order based on the determined locations of the one or more items within the warehouse; and transmitting the determined picking sequence of the one or more items in the order to a shopper client device associated with a shopper assigned to fulfill the order, causing the determined sequence of the one or more items in the order to be displayed on the shopper client device.

2. The method of claim 1, further comprising:

determining and recording a real picking sequence and actual item locations based on locations and order picking progress received from the shopper client device.

3. The method of claim 2, further comprising:

causing the item catalog to be updated based on actual item locations recorded during the fulfillment of the order.

4. The method of claim 1, wherein selecting the identified alternative item for which the online concierge system has the location within the warehouse comprises:

selecting an alternative item for which the online concierge most recently received an indication from a shopper that the alternative item was obtained for an order.

5. The method of claim 1, wherein selecting the identified alternative item for which the online concierge system has the location within the warehouse comprises:

identifying previously received orders including at least one identified alternative item; and selecting an alternative item included in a previously received order and for which the online concierge most recently received an indication from a shopper that the alternative item was obtained.

6. The method of claim 5, wherein selecting an alternative item is further based on an item popularity score of the identified alternative item, the item popularity score reflecting a frequency of fulfillment for the alternative item.

7. The method of claim 1, wherein the taxonomy is generated based on one or more of attributes of items including item categories, brands, sizes, weights, and price ranges.

8. The method of claim 7, further comprising generating the taxonomy using a machine-learning classification model that groups items based on shared attributes.

9. The method of claim 1, wherein determining, by the online concierge system, the picking sequence of the one or more items in the order comprising:

obtaining a layout of the warehouse, the layout identifying relative locations of aisles and corresponding items within the warehouse;

determining the picking sequence to reduce a distance traveled by a hopper within the warehouse based on the layout of the warehouse.

10. The method of claim 1, wherein the transmitted picking sequence includes visual indicators on a map of the warehouse for each item location to assist the shopper in locating the items.

11. A non-transitory computer readable storage medium having instructions encoded thereon that, when executed by one or more processors, cause the one or more processors to perform steps comprising:

receiving, at an online concierge system, an item catalog from an inventory system, the item catalog identifying locations within a warehouse for a set of items offered by the warehouse;

obtaining a taxonomy at the online concierge system, the taxonomy including multiple levels, with different levels providing different levels of specificity about items offered by the warehouse included in the levels;

receiving, at the online concierge system, an order from a customer client device associated with a user for fulfillment at the warehouse, the order including one or more items;

for each of the one or more items, determining whether the item catalog includes a location of the item;

responsive to determining that the item catalog associated with the warehouse does not have a location of the item within the warehouse, identifying one or more alternative items from the taxonomy based on shared attributes between the item and the one or more alternative items;

selecting an identified alternative item for which the online concierge system has a location within the warehouse; and determining the location within the warehouse of the item as the location within the warehouse of the selected identified alternative item;

determining, by the online concierge system, a picking sequence of the one or more items in the order based on the determined locations of the one or more items within the warehouse; and transmitting the determined picking sequence of the one or more items in the order to a shopper client device associated with a shopper assigned to fulfill the order, causing the determined sequence of the one or more items in the order to be displayed on the shopper client device.

12. The non-transitory computer readable storage medium of claim 11, wherein the one or more processors are further caused to determine and record real-time item locations based on locations and order picking progress received from the shopper client device.

13. The non-transitory computer readable storage medium of claim 12, wherein the one or more processors are further caused to cause the item catalog to be updated based on actual item locations recorded during the fulfillment of the order.

14. The non-transitory computer readable storage medium of claim 11, wherein selecting the identified alternative item for which the online concierge system has the location within the warehouse comprises:

selecting an alternative item for which the online concierge most recently received an indication from a shopper that the alternative item was obtained for an order.

15. The non-transitory computer readable storage medium of claim 11, wherein selecting the identified alternative item for which the online concierge system has the location within the warehouse comprises:

identifying previously received orders including at least one identified alternative item; and selecting an alternative item included in a previously received order and for which the online concierge most recently received an indication from a shopper that the alternative item was obtained.

16. The non-transitory computer readable storage medium of claim 15, wherein selecting an alternative item is further based on an item popularity score of the identified alternative item, the item popularity score reflecting a frequency of fulfillment for the alternative item.

17. The non-transitory computer readable storage medium of claim 11, wherein the taxonomy is generated based on one or more of attributes of items including item categories, brands, sizes, weights, and price ranges.

18. The non-transitory computer readable storage medium of claim 17, further comprising generating the taxonomy using a machine-learning classification model that groups items based on shared attributes.

19. The non-transitory computer readable storage medium of claim 11, wherein determining, by the online concierge system, the picking sequence of the one or more items in the order comprising:

obtaining a layout of the warehouse, the layout identifying relative locations of aisles and corresponding items within the warehouse;

determining the picking sequence to reduce a distance traveled by a hopper within the warehouse based on the layout of the warehouse.

20. A computing system, comprising:

one or more processors; and a non-transitory computer readable storage medium having instructions encoded thereon that, when executed by the one or more processors, cause the one or more processors to perform steps comprising:

receiving, at an online concierge system, an item catalog from an inventory system, the item catalog identifying locations within a warehouse for a set of items offered by the warehouse;

obtaining a taxonomy at the online concierge system, the taxonomy including multiple levels, with different levels providing different levels of specificity about items offered by the warehouse included in the levels;

receiving, at the online concierge system, an order from a customer client device associated with a user for fulfillment at the warehouse, the order including one or more items;

for each of the one or more items, determining whether the item catalog includes a location of the item;

responsive to determining that the item catalog associated with the warehouse does not have a location of the item within the warehouse, identifying one or more alternative items from the taxonomy based on shared attributes between the item and the one or more alternative items;

selecting an identified alternative item for which the online concierge system has a location within the warehouse; and determining the location within the warehouse of the item as the location within the warehouse of the selected identified alternative item;

determining, by the online concierge system, a picking sequence of the one or more items in the order based on the determined locations of the one or more items within the warehouse; and transmitting the determined picking sequence of the one or more items in the order to a shopper client device associated with a shopper assigned to fulfill the order, causing the determined sequence of the one or more items in the order to be displayed on the shopper client device.

* * * * *